Patented Sept. 24, 1935

2,015,481

UNITED STATES PATENT OFFICE 2,015,481

MANUFACTURE OF MOLDED ARTICLES

Victor Lefebure, London, England, assignor to Imperial Chemical Industries Limited, a corporation of Great Britain No Drawing. Application June 17, 1932, Serial No. 617,859. In Great Britain June 23, 1931

3 Claims. (Cl. 106—34)

This invention relates to the manufacture of building blocks and other preformed molded articles.

Building blocks hitherto used in the building trade have comprised essentially either Portland cement together with cellular filling material such as coke breeze, ground clinker, pumice or the like, or Portland cement itself in a porous or cellular form obtained by generating gas within the liquid cement prior to setting. Such Portland cement products have the serious drawback of suffering volume changes during early life and subsequently under varying moisture conditions.

The principal object of this invention is to provide an improved building block or other preformed molded article of light yet strong construction which is not susceptible to volume change due to varying moisture conditions. For this purpose I employ as the essential material of the block or article a calcium sulphate plaster of the accelerated anhydrite type, and I give to the same a void or cellular structure by generating gas within the plastic mass prior to, or rather during setting. By the expression "calcium sulphate plaster of the accelerated anhydrite type" I mean any plaster made from the mineral "anhydrite" the setting properties of which are due essentially to the hydration of the anhydrous calcium sulphate under the influence of small proportions of suitable accelerators, e. g. alkali metal salts, certain metal sulphates, or mixtures thereof, especially the accelerators described in British Patents 236,695 and 317,672. (U. S. 1,879,877). These patents describe the use of several accelerators, among them potassium sulphate, zinc sulphate and alum. Mixtures of potassium sulphate and zinc sulphate or of ammonium sulphate and zinc sulphate are described as satisfactory. By varying the percentage of accelerator added, within a rather wide range, between 0.125 and 2 per cent, the time of set may be varied correspondingly within a range of, say 30 minutes to 18 hours.

The invention consists accordingly in a building block or other preformed molded article having a void or cellular structure and consisting of a calcium sulphate plaster of the accelerated anhydrite type, with or without inert ingredients such as fillers or pigments.

The invention also consists in a block or article as described in the preceding paragraph, at least one surface of which is modified by one of the following treatments, singly or in any combination:—

(1) Application of a pigmented or unpigmented reinforcing layer of neat plaster (of non-cellular structure) and/or of fibrous material such as board or fabric which may be bedded in the surface.

(2) Application of a layer of glossy plaster obtained by mixing together one or more of the materials belonging to the class (a) consisting of hydrated lime, Portland cement, the so-called white cements which have a somewhat higher alumina content than Portland cement, and cements having a high alumina content, e. g. ciment fondu; and (b) that of calcium sulphate plasters of the accelerated anhydrite type, with or without fillers such as sand and pigments.

(3) Application of an aqueous emulsion of bitumen, to give an impermeable waterproof surface, with or without a subsequent application of glossy plaster obtained as described above. This treatment is of particular importance in connection with the use of the blocks for facing brick walls, as the treated face resists the penetration of water from the background.

(4) Waterproofing with the aid of a soluble salt of a higher fatty acid. This treatment is of importance in connection with the protection of the blocks during storage, when they may be exposed to the weather.

The above treatments are applied to the separate blocks, which may be units of any practicable size, e. g. up to 8 feet long by 4 feet wide. Decorative faces may also be obtained by causing the setting of the blocks in contact with smooth celluloid, which gives glassy surfaces, or by spraying the material into the mold in such a way that relief effects are obtained on the exposed surface.

The invention also includes the following methods of making the improved blocks above referred to:—(1) A large sheet or block of the material is obtained in a mold and the partially set mass is guillotined into blocks of the desired size, or the sheet after setting is saw-cut into such blocks. Thus a plaster comprising anhydrite and a joint gas-producing agent and accelerator, may be gauged with water and allowed to set in a shallow container, when the mix will expand to say two or three times its initial volume and will retain a continuous level upper surface without superficial discontinuities. The sheet plaster so obtained is then divided into blocks as mentioned above. Comparatively deep molds, e. g. up to 2 feet in depth, may be used in operating according to this method.

(2) A large sheet or block of the material is made in a shallow or deep mold, partitions being inserted before or after pouring the plastic, thereby dividing up the mass into blocks of the desired size without cutting. If desired, the partitions may be surfaced with neat or decorated plaster, which bonds with the material in the mold.

(3) A block is built up by pouring into a deep mold say sufficient plastic to fill a depth of 6 inches, this is allowed to expand, but not necessarily to set, and the process is repeated until a block of the desired depth is obtained. This method has been proved feasible in spite of the apparent danger of the pouring of the upper layers causing the destruction of the submerged weak wet plastic structure. This method is particularly adapted for use with rapid setting and rapid expanding mixes.

(4) A block or sheet is built up continuously in a mold by separate continuous application of wet plastic and gas-producing agent.

(5) A block or sheet is built up in stages by applying a layer of wet normal plaster (i. e. non-cellular plaster) in a mold by pouring or spraying, followed by a spray of a solution of a suitable gas-producing agent, e. g. aluminium sulphate (which reacts with carbonate present in the plaster, thereby generating carbon dioxide gas), the process being repeated until the required thickness has been attained, if necessary with suitable pauses between the application of successive layers. The special advantage of this method is that it enables a quick-setting and quick-expanding plaster, especially one in which the gas-producing agent functions also as accelerator, to be dealt with. In normal pouring or spraying operations a fairly slow-setting and slow-expanding plaster has to be employed to allow the time for mixing, pouring or spraying and adjusting, whereas by the new method greater latitude is enjoyed owing to the separate application of the ingredients.

In applying the above methods it has been found that the rate of expansion of the plastic is sometimes too great in relation to the rate of setting, so that the plastic expands beyond its strength and partial collapse occurs in the lower layers owing to the weight of the superposed material, thus giving rise to an inferior product. It is therefore desirable to enhance the rate of setting in such cases, but this is difficult to accomplish without loading the plaster with undesirably high proportions of accelerators, which impair the strength of the product, add to its cost and otherwise introduce objections.

I have found, however, that excellent quick-setting mixes of the kind described, which are free from the above mentioned drawback, are obtained by including a modicum, that is to say a minor proportion, up to 20 per cent, of plaster of Paris, or other calcium sulphate plaster of the hemihydrate type, in the mix. The resulting mixes, when gauged with water, have greatly accelerated speeds of sets as compared with those not containing plaster of Paris or the like and by varying the proportions of plaster of Paris or the like the speed can be adjusted to meet the requirements of any particular case, depending upon the rapidity of gas evolution in the plastic.

The plaster of Paris or the like may be added as a dry ingredient to the mix, or it may be gauged separately with water and the resulting plastic poured into the main plastic immediately before pouring the whole into the molds. This method allows molds of considerable depth, e. g. 2 feet or more, to be produced.

The accelerating influence of hemihydrated calcium sulphate upon the setting of anhydrite has already been pointed out in British Patent Specification No. 337,926, but the present invention utilizes this property in a particularly advantageous way in connection with the setting of porous or cellular plasters.

The following examples illustrate practical applications of the invention:—

Example 1

A mix sufficient to make 24 blocks is prepared from the following ingredients:—

| | Pounds |
|---|---|
| Anhydrite | 686 |
| Aluminium sulphate | 29 |
| Potassium sulphate | 7 |
| Chalk | 3 |

The anhydrite is the fine ground mineral. Water is added in amount between 23.7 and 25.6 per cent calculated on the weight of the dry solids, and the resulting mix is poured into a mold. The mix begins to stiffen in about 15 minutes and the mold can be stripped after about 3½ hours, although generally it is preferred to strip the mold only after 24 hours. The top of the block is levelled by cutting off the surplus material, after the initial stiffening of the mass, followed by skimming the surface with a trowel. Alternately the whole mass can be allowed to set firmly and a level top made by sawing off a sufficient thickness of material.

As will be noted from an inspection of the proportions given, the chalk (calcium carbonate) is not sufficient for complete reaction with the aluminium sulphate. At the end of the action therefore, while some of the chalk has reacted with the formation of $CO_2$ for expansion of the mix, there is additional aluminium sulphate left over to act as an accelerator. The composition at the time of setting contains two accelerators, potassium sulphate and aluminium sulphate. The former is what may be called a fast accelerator, while the aluminium sulphate is more slowly acting. The amount of potassium sulphate is such as to give a convenient rate of acceleration. The amount of the two accelerators, taken together is rather small; not over 5 per cent. There is sufficient for the acceleration desired but not enough to leave an inconvenient amount of solubles in the finish block. Leachable constituents in a building block for structural purposes are quite undesirable.

Example 2

About 12 parts by weight of anhydrite are mixed with about 1 part by weight of plaster of Paris, ½ part by weight of aluminium sulphate, ⅕ part by weight of potassium sulphate, 1/16 part by weight of finely divided chalk and about 4 parts by weight of water. This mixture is poured into a suitable mold, when in a few minutes, according to temperature and general conditions, it rapidly rises to an expansion of from 2 to 2½ times its original volume. In 15 minutes the full expansion has occurred without collapse, and the material has consolidated sufficiently for the top projecting material to be cut or skimmed.

As many apparently widely different embodiments of this invention may be made without departing from the spirit and scope thereof, it is to be understood that I do not limit myself to the specific embodiments thereof except as defined in the appended claims.

I claim:

1. A water resistant molded article having a high inherent structural strength enabling it to be used as a unit in constructions, said article having an internal cellular structure including bubble-like voids and being composed of a set calcium sulphate plaster of the accelerated mineral anhydrite type containing enough of a soluble accelerator to catalyze the set of anhydrite within a reasonable period but not enough to leave in the set article any substantial amount of material which can be leached out with water.

2. A molded article of high structural strength and highly water resistant, said article having an internal cellular structure including bubble-like voids and being composed of a set calcium sulphate plaster of the accelerated mineral anhydrite type containing a modicum of partially dehydrated gypsum.

3. A water resistant molded article having a high inherent structural strength enabling it to be used as a unit in construction, said article having an internal cellular structure including bubble-like voids and being composed of a set calcium sulphate plaster of the accelerated mineral anhydrite type and containing minor amounts of potassium sulphate and aluminium sulphate.

VICTOR LEFEBURE.